July 4, 1967 H. OKITA ET AL 3,328,916
SEED TAPE
Filed Jan. 10, 1966

INVENTORS
HARUTO OKITA
FREDERICK W. ROHNERT
JAMES W. CHANEY

Owen, Wickersham, & Erickson
ATTORNEYS

United States Patent Office 3,328,916
Patented July 4, 1967

3,328,916
SEED TAPE
Haruto Okita and Frederick W. Rohnert, Hollister, and James W. Chaney, Gilroy, Calif., assignors to Waldo Rohnert Co., Hollister, Calif., a corporation of California
Filed Jan. 10, 1966, Ser. No. 519,674
15 Claims. (Cl. 47—56)

This invention relates to an improved seed tape and to tapes for planting various types of plant propagating members, such as bulbs, corms, tubers, eyes and vegetative propagation segments.

For many years the desirability of seed tapes has been known. The advantages of not having to thin the plants, of being able to plant seeds in exact rows to exact depths and to save on the amount of seed initially planted have been evident. However, seed tapes have not come into general use, because their disadvantages have heretofore outweighed their advantages. The cost of the materials proposed has been high, and the cost of securing the seeds to the tapes has been high. Most proposed materials have either been too weak for use of rapid planting equipment or have been too indestructible after planting, so that they interfered with the proper growth of the plants.

Most seed tapes proposed so far have incorporated adhesives to attach the seeds to the tape, and some of these have apparently been deleterious. For example, Nestor, in his Patent Number 2,648,165, states that the proteinaceous adhesives tended to be detrimental to seeds, to reduce the proportion of the seeds which germinated, and to retard early stages of growth. Nestor then proposed the use of non-proteinaceous adhesives and affixed his seed to a tacky adhesive material carried on a temporary backing, preferably covering the seed over with another layer of the non-proteinaceous adhesive. After his adhesive material had reached a certain degree of hardness, he stripped it from the backing. However, although Nestor said his adhesive materials had "self-sustaining dry strength," his requirement that the adhesives have "wet strength insufficient to be self-sustaining" resulted in their having a low tensile strength even when dry. They were, therefore, difficult to use in rapid machine planting. The tape tended to break easily and made very little stir in the market during the relatively brief time that attempts were made to use it commercially.

We have found that superior results are obtained by using for the tape a particular type of non-adhesive material which has considerable tensile strength when dry and which is quite readily water soluble. Our material is not a tacky adhesive and is not glued or stuck or adhered to the seed. Instead, we prefer to envelop the seed in this tape and seal the tape to itself around the seed.

We have found that the condition of the seed itself is important in the use of seed tapes. This is a factor that apparently has not been considered heretofore, possibly because many of the seed-tape inventions have been made by farmers or by people in the tape business rather than by seedsmen. We have found it important for the seed to be dried to substantially the same moisture content as that approved by government agencies for canning the seeds in hermetic containers. Typically, this has a maximum moisture content of about 3% to 9% for most seeds. We have found that seeds at proper moisture content enable the seed tapes to be stored in rolls without resulting in degradation of the seeds. It is important in seed tapes for the seeds to have a very high germination factor, because otherwise the advantage of spacing the seeds apart is lost, for if many seeds fail to emerge, empty places are left. Since the precise occurrence of the failures cannot be predicted, it is impossible to compensate except by losing the very advantage which seed tapes seek to gain. In assuring maximum germination we have found that both the proper material for the seed tape and the proper moisture content for the seed are of prime importance.

We have also found it important for proper germination and plant growth that the seed tape should be dissolved very readily by water, preferably dissolved at the time of planting. This requires the tape to be made from a material which is quite readily water soluble, as against materials which merely disintegrate or materials which dissolve relatively slowly.

We have also found it important to orient the seeds properly on the seed tape. When the seeds are oriented differently, they do not emerge uniformly even if a seed tape is placed at the same depth. For instance, if some of the seeds are upside down with their hypocotyl ends on the bottom and some are right side up, then the seeds that are planted upside down will emerge from two to five days later and will never make up their lateness during the growing season, so that at harvest some of the crop will mature two to five days earlier than the rest. It is far preferable, particularly in mechanized farming, to have all the seeds oriented in the same way. This means that with oblong seeds, such as lettuce, they are placed on their sides with the radical ends and the hypocotyl ends at the same depth relation to the soil surface, preferably lengthwise of the tape. This, we have found, promotes uniform emergence of the cotyledons and eventual improvement in the uniformity of the crop at harvest time.

Other objects and advantages will appear from the following description of the preferred forms of this invention.

We employ as the essential materials for this seed tape water-soluble ethoxylated polymers, preferably polyethylene oxide film, preferably having a thickness of one-half to four mils. This material is remarkable in having both rapid solubility and considerable tensile strength when dry. Also, it is quite stable when stored dry. A commercially available one-mil film, consisting essentially of polyethylene oxide, for example has a tensile modulus of 40,000 p.s.i. when dry, yet at 68° it will dissolve completely in water within 120 seconds and at 104° will dissolve completely in 60 seconds. The contents are released respectively within 14 and 7 seconds after the water is added.

A commercially available two-mil film consisting essentially of polyethylene oxide has a specific gravity of 1.2 and has an area factor of 11,300 square inches per pound, so that a half-inch tape gives about one-third of a mil per pound. Its tensile strength is about 8,000 p.s.i. MD and about 1,400 to 2,000 p.s.i. TD. Its elongation is 90% to 150% MD and 600 to 700% TD. It has a secant modulus at 1% of 33,000 to 86,000 p.s.i. MD (depending on the grade of material chosen) and 44,000 to 90,000 p.s.i. TD. It has a tear strength of about 10 to 20 grams per mil MD. Its dart impact at 50% failure is 60 to 225 grams, depending on the grade used. Solubility is excellent, releasing contents in less than 7 seconds and dissolving completely within about 80 seconds, at 40° C. It is durable, is clear, and can be heat sealed in a fraction of a second at 160° to 325° F. It can also be sealed by applying a little water and pressure. When protected from light, heat, and moisture it stores well for long periods and does not crack from cold until temperatures of about −70° C. are reached. It can be handled easily by machines, kept taut without risk of breakage, and yet can be dissolved at planting time by adding water to the soil.

Materials consisting essentially of water-soluble ethoxylated polymers, such as polyethylene oxide, containing minor amounts of plasticizers and other materials that improve its qualities, are sold under the trademark "Radel" by Union Carbide Corporation, and they are available in tape form. They can also be obtained in a form extrudable y the seedsman into a tape. Normally such tape is slick, nd no tackiness develops until after several seconds of ctive moistening, whereupon it soon dissolves. We prefer ɔ place the seeds approximately in the center of the tape ɔ one side of center and then to fold the tape over with he fold closely adjacent the seeds and then to secure the ree edges of the tape together by a heat or water seal. The heat seal may be ¼ second at 275° to 300° F. at 30 ɔ 50 p.s.i. or ½ second at the same pressure at 235°–250° ↑. The water seal is done by wetting the edges and then ressing them firmly together, or by moistening the enire tape before putting the seed on it and then folding he tape and pressing the edges firmly together. This enapsulates the seed in an envelope-like tape and retains t at the proper spacing. There may be some adherence of he seed to the tape, but that is not sought after. The etention of the seed by the tape is due primarily or enirely to the envelopment of the seed by the tape.

The seed itself is preferably dried carefully to a moisure content no greater than that approved by governmenal agencies for packaging in hermetically sealed packages ɔr containers. For example, sweet corn, perennial ryegrass, ipinach, and crimson clover are permitted a maximum of ieed moisture of about 8%, with a 1% tolerance permisible so that this would means a maximum permissible of ∂%. Beets and chard are not to exceed a 7.5% moisture content. Snap beans, lima beans, peas, carrots, and celery are not to exceed a 7% moisture content. Onions, leek, chives, parsley, and watermelon are not to exceed a 6.5% moisture content; Kentucky bluegrass, parsnips, eggplant, cucumber, muskmelon, squash, and pumpkin are not to exceed a 6% moisture content. Lettuce and tomato seeds are not to exceed a moisture content of 5.5%; cabbage, broccoli, cauliflower, collards, kale, turnips, rutabaga, kohlrabi, brussels sprouts, mustard, and radishes are not exceed a maximum of 5% moisture content. Pepper is limited to a moisture content of 4.5% and creeping red fescue seeds are limited to a maximum moisture of 3.0 percent. In all these, 1% tolerance is permitted. Other seeds should be similarly dried within the permissible ranges, or where none has been prescribed, within corresponding dry ranges.

As stated before, the dried seeds are preferably placed in a uniform attitude so that the radical and hypocotyl end are preferably on the same level, at least as for any seeds where this is feasible. It does not matter on the small round seeds, but it does matter on the long narrow or oblong seeds, which are capable of much greater difference in orientation. These are preferably placed with their lengthwise axis extending lengthwise of the tape.

The seed may, if desired, be pelletized prior to being placed on the tape, in a suitable medium conducive to superior germination or growth after germination or protection from fungi or pests. The tape itself may contain fertilizer, hormones, or other materials advantageous for the purpose; it may also be tinted or colored to indicate seed type or other intelligence. The tape may be twisted or spun into a twine-like strand, if desired, after the seed has been enveloped in it. Tubular enveloping material may also be used.

Figure 4:
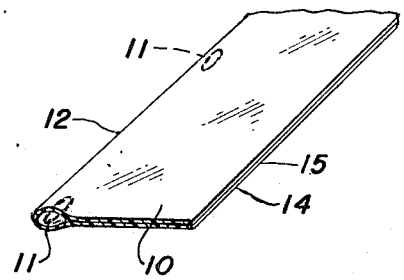
FIG. 4 shows an enlarged view of the seed tape of FIG. 2 seen at approximately right angles with respect to FIG. 2 thereto and with the tape folded over and heat sealed.

A seed tape 10 of polyethylene oxide film one-half to four mils thick (preferably 1–2 mils thick) is fed along a surface in any suitable manner, and seeds 11 are placed thereon by any means suitable to retaining their alignment. Preferably, long seeds are aligned longitudinally. No adhesive or other tacky material is needed. The seed is placed closely adjacent the center line or a pre-fold line 12 and then the tape 10 is folded over along the line 12 to give the envelope-like tape 10 shown in FIG. 4. The free edges 14 and 15 are water sealed or heat sealed together, and the seed tape 10 thus maintains its tensile strength. For water seal, the whole tape may be premoistened, or the edges only can be moistened. It can then be rolled into long rolls and when planted can be unrolled while kept taut without danger of breakage as would be the case with the use of adhesives and of other materials which are sufficiently soluble in water. The seed tape 10, when planted, is laid to the correct depth at 16, which determines the depth of the seed, is covered with soil, and is preferably watered soon thereafter. The water dissolves the tape 10 within a few moments, so that its traces cannot be found after a rather short interval of time, leaving the seed in the soil in proper condition for germination. Fertilizers, hormones, and other desirable materials are thereby deposited in the soil near the seed at an ideal location.

Figure 1:
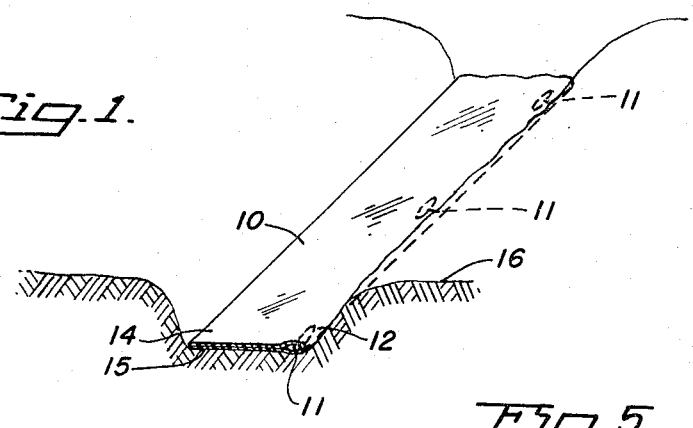
FIG. 1 is an enlarged view in perspective and in section of a seed tape imbedded in the ground prior to dissolution of the tape material by water.
Figure 5:
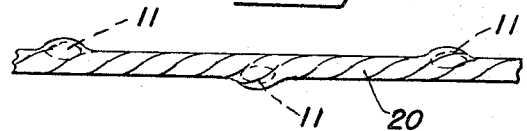
FIG. 5 is a view of a speed tape like that of FIG. 2 twisted into a twine-like strand.
Figure 2:
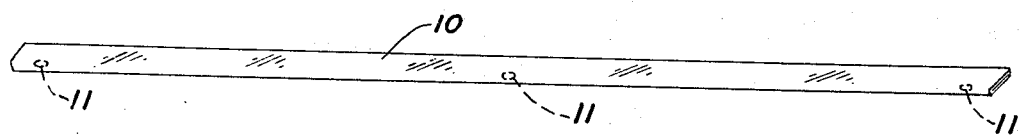
FIG. 2 is a fragmentary view in perspective of a portion of a seed tape embodying the principles of the invention.
Figure 6:
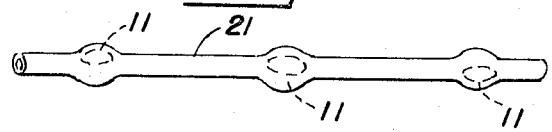
FIG. 6 is a view of a tubular seed containing envelope of the same type.
Figure 3:
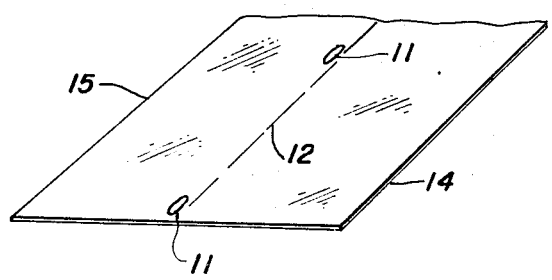
FIG. 3 is a fragmentary view of a portion of the tape showing the placement of the seeds prior to folding.

FIG. 5 shows a twine-like strand 20, made by twisting a tape 10 containing the seeds 11. Such a strand sometimes has strength advantages. FIG. 6 shows a seed-containing tube 21 basically similar to the tape 10.

The tape 10 need not be uniform in width, it may be wider where it includes large seeds and narrower between seeds.

Tests have been made, comparing the effect of our new seed tape germination. In many seeds it was found that germination was actually improved by use of the seed tape, and, where not improved, the performance was equal or substantially equal to that of the seed without the tape. The reason for the improvement would appear to be proper and uniform planting of the seed. The tests were made with seeds of the same dryness selected for the same bath, so seed condition could not have been the difference. The seeds not only tended to have as good a germination ratio but tended to come up slightly quicker than they had heretofore. In the case of oblong seeds, they also came up more uniformly than did seeds which were planted without the tape.

Other propagating material can be used, such as bulbs, corms, tubers, eyes, and clones. In the instance of larger bulbs, the tape is of course made larger and preferably thicker, but it still envelops the plant material and it will still dissolve quite soon and with quite good results.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A plant propagating device comprising an elongated envelope consisting essentially of thin, readily water-soluble ethoxylated polymer and a series of regularly spaced apart plant propagating media enclosed in said envelope and retained in position therein by envelopment.

2. The device of claim 1 wherein said envelope comprises a flat tape folded over said media and sealed to itself to provide the envelope.

3. The device of claim 1 wherein said envelope comprises a twisted strand.

4. The device of claim 1 wherein said envelope comprises a tube.

5. The device of claim 1 wherein said envelope contains minor amounts of plant protecting and growth promoting materials.

6. The device of claim 1 wherein said plant propagating media is chosen from the group consisting of seeds, bulbs, corms, tubes, eyes, clones and cuttings.

7. A propagating material comprising a tape of thin, readily water-soluble polyethylene oxide folded over along its longitudinally extending mid-line to provide two layers and sealed to itself, and a series of regularly spaced apart and oriented plant propagating media in between the two layers so as to be enclosed thereby and retained by the envelopment.

8. A seed tape comprising a strip of readily water-soluble polyethylene oxide one-half to four mils thick with seeds disposed at regular intervals along approximately the center line of the tape, said tape being folded over along said center line and sealed to itself so as to enclose said seeds and maintain their spacing, said seed being dried to moisture levels permissible for hermetic sealing in containers.

9. The tape of claim 8 wherein the tape is twisted into a twine-like strand.

10. The tape of claim 8 wherein the enclosed seed is pelleted in a protective and growth enhancing material.

11. A propagating material comprising a tape of thin, readily water-soluble polyethylene oxide folded over along its longitudinally extending mid-line to provide two layers and sealed to itself, and a series of regularly spaced apart seeds enveloped between the two layers and non-adhesively held thereby.

12. A seed tape comprising a strip consisting essentially of readily water-soluble polyethylene oxide one-half to four mils thick with seeds disposed at regular intervals along approximately the center line of the tape, said tape being folded over along said center line and sealed to itself and not adhered to the seeds so as to enclose said seeds and maintain their spacing, said seed being dried to moisture levels permissible for hermetic sealing in containers.

13. The tape of claim 12 wherein the seed is long and narrow and is disposed lengthwise of said tape.

14. The tape of claim 12 wherein the tape includes integrally dissolved in said polyethylene oxide growth promoting and plant-protecting materials.

15. The tape of claim 12 wherein the tape is colored.

References Cited
UNITED STATES PATENTS

| | | | |
|---|---|---|---|
| 614,002 | 11/1898 | Jenkins | 47—56 |
| 851,171 | 4/1907 | Israel | 47—56 |
| 1,160,279 | 11/1915 | Gray et al. | 47—56 |
| 2,648,165 | 8/1953 | Nestor | 47—56 |
| 2,967,376 | 1/1961 | Scott | 47—1 |
| 3,080,681 | 3/1963 | Merrill et al. | 47—56 |
| 3,154,030 | 10/1064 | Williams | 111—1 |

ABRAHAM G. STONE, *Primary Examiner.*

ROBERT E. BAGWILL, *Examiner.*